(12) United States Patent
Colle

(10) Patent No.: US 6,222,083 B1
(45) Date of Patent: Apr. 24, 2001

(54) METHOD FOR INHIBITING HYDRATE FORMATION

(75) Inventor: Karla Schall Colle, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 0 days.

(21) Appl. No.: 09/410,931

(22) Filed: Oct. 1, 1999

(51) Int. Cl.⁷ .................................................... C07C 7/20
(52) U.S. Cl. ................... 585/15; 585/590; 137/3; 137/13; 166/310; 166/371
(58) Field of Search .............. 585/15, 950; 137/3; 137/13; 166/310, 371

(56) References Cited

U.S. PATENT DOCUMENTS

| | | | |
|---|---|---|---|
| H1749 | 9/1998 | Colle et al. | 585/15 |
| 4,856,593 | 8/1989 | Matthews et al. | 106/310 |
| 5,276,248 | 1/1994 | Engelhardt et al. | 585/899 |
| 5,420,370 | 5/1995 | Sloan, Jr. | 585/15 |
| 5,426,258 | 6/1995 | Thomas et al. | 585/15 |
| 5,432,292 | 7/1995 | Sloan, Jr. | 585/15 |
| 5,491,269 | 2/1996 | Colle et al. | 585/15 |
| 5,583,273 | 12/1996 | Colle et al. | 585/15 |
| 5,600,044 | 2/1997 | Colle et al. | 585/15 |
| 5,639,925 | 6/1997 | Sloan, Jr. et al. | 585/15 |
| 5,744,665 | 4/1998 | Costello et al. | 585/15 |
| 5,841,010 | 11/1998 | Rabeony et al. | 585/3 |
| 5,874,660 | 2/1999 | Colle et al. | 585/15 |
| 5,880,319 | 3/1999 | Sloan, Jr. | 585/15 |
| 5,900,516 | 5/1999 | Talley et al. | 585/15 |
| 5,936,040 | 8/1999 | Costello et al. | 525/178 |
| 5,981,816 | 11/1999 | Sinquin et al. | 585/15 |
| 6,015,929 | 1/2000 | Rabeony et al. | 585/15 |
| 6,093,862 * | 7/2000 | Sinquin et al. | 585/15 |
| 6,093,893 * | 7/2000 | Cohen et al. | 585/15 |
| 6,117,929 * | 9/2000 | Bakeev et al. | 585/15 |

FOREIGN PATENT DOCUMENTS

| | | |
|---|---|---|
| 0 812 307 B1 | 6/1996 | (EP) . |
| 2178366 | 6/1996 | (CA) . |
| WO 96/37684 | 5/1996 | (WO) . |
| WO 96/38492 | 5/1996 | (WO) . |
| WO 96/41786 | 6/1996 | (WO) . |

OTHER PUBLICATIONS

Chen, F. M. F., Lee, Y., Steinauer, R., and Benoiton, L. Mixed anhydrides in peptide synthesis, A study of urethane formation with a contribution on minimization of racemization, *Can. J. Chem* (1987), pp. 613–618.

Szczepanski, R., Edmonds, B., Brown, N. and Hamilton, T. Research provides clues to hydrate formation and drilling-hazard solutions, *Oil & Gas Journal* (Mar. 9, 1998), pp 52–56.

* cited by examiner

*Primary Examiner*—Jacqueline V. Howard
(74) *Attorney, Agent, or Firm*—Denise Y. Wolfs

(57) ABSTRACT

A method for inhibiting the formation of gas hydrates in a petroleum fluid having hydrate-forming constituents is claimed. More specifically, the method can be used to treat a petroleum fluid, such as natural gas conveyed in a pipe, to inhibit the formation of a hydrate flow restriction in the pipe. The hydrate inhibitors used for practicing the method comprise substantially water soluble homopolymers and copolymers of N-acyldehydroalanine derivatives which are esters or amides of N-acyldehydroalanine.

21 Claims, No Drawings

METHOD FOR INHIBITING HYDRATE FORMATION

FIELD OF THE INVENTION

The present invention relates to a method for inhibiting the formation of clathrate hydrates in a fluid. More specifically, the invention relates to a method for inhibiting the formation of gas hydrates in a pipe used to convey oil or gas.

BACKGROUND OF THE INVENTION

Petroleum fluids typically contain carbon dioxide and hydrogen sulfide, as well as various hydrocarbons, such as methane, ethane, propane, normal butane and isobutane. Water, present as a vapor and/or as a liquid phase, is also typically found mixed in varying amounts with such hydrocarbons. Under conditions of elevated pressure and reduced temperature, clathrate hydrates can form when such petroleum fluids contain water. Clathrate hydrates are water crystals which form a cage-like structure around "guest" molecules such as hydrate-forming hydrocarbons or other gases. Some hydrate-forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Other gases which may form hydrates include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of natural gas and other petroleum fluids. For example, at a pressure of about 1,000 kPa (145 psi), ethane can form gas hydrates at temperatures below 4° C.(39° F.), and at a pressure of 3,000 kPa (435 psia), ethane can form gas hydrates at temperatures below 14° C.(57° F.). Such temperatures and pressures are not uncommon for many operating environments where natural gas and other petroleum fluids are produced and transported.

As gas hydrates agglomerate, they can produce hydrate blockages in the pipe or conduit used to produce and/or transport natural gas or other petroleum fluids. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions often requires design and equipment modifications, such as insulated or jacketed piping. Such modifications are costly to implement and maintain. The amount of antifreeze required to prevent hydrate blockages is typically between 10% to 30% by weight of the water present in the oil or gas stream. Consequently, several thousand gallons per day of such antifreeze can be required. Such quantities present handling, storage, recovery, and potential toxicity issues. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

As discussed more fully below, the inhibitors of this invention can effectively treat a petroleum fluid having a water phase, or a petroleum fluid containing water vapor that may condense to form a water phase, depending upon the operating environment.

The use of polymeric inhibitors has been proposed, however, these materials have a tendency to precipitate out of solution at higher temperatures. This is an undesirable characteristic, since the inhibitor must stay in solution under a wide range of temperatures to be most effective. The monomers described herein yield homopolymers and copolymers with good inhibition properties as well as better solubility at higher temperatures.

SUMMARY OF THE INVENTION

According to the invention, there is provided a method for inhibiting the formation of clathrate hydrates in a fluid having hydrate-forming constituents. One embodiment of the method comprises contacting the fluid with an inhibitor comprising a polymer or copolymer which has been made from esters or amides of N-acyldehydroalanine. In an alternative embodiment, the fluid is treated with a copolymer of such N-acyldehydroalanine monomers copolymerized with a comonomer that is known, when polymerized with itself, to exhibit hydrate inhibition.

The polymers and copolymers of the invention can be classified as N-acyldehydroalanine derivatives, and are characterized by the general formula:

where the sum of x and y is an average number sufficient to produce a number average molecular weight between about 1,000 and about 1,000,000.

In one embodiment, A is the following "mer-unit" produced from an ester of an N-acyldehydroalanine:

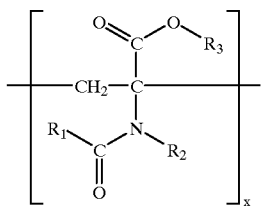

where,
$R_1$ is a hydrogen atom or a hydrocarbon group having one to six carbon atoms,
$R_2$ is a hydrogen atom or a methyl group,
$R_3$ is a hydrocarbon group having one to six carbon atoms, and
x is an average number of repeating monomeric units for producing an average molecular weight for said polymer between about 1,000 and about 1,000,000.

Preferably, $R_1$ and $R_2$ are, independently, a hydrogen atom or a methyl group, and $R_3$ is an alkyl group with zero to two heteroatoms.

In another embodiment, A is the following "mer-unit" produced from an amide of an N-acyldehydroalanine:

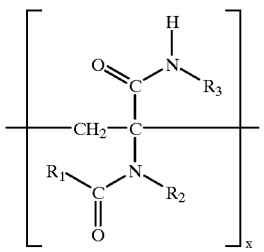

where,
- $R_1$ is a hydrogen atom or a hydrocarbon group having one to six carbon atoms,
- $R_2$ is a hydrogen atom or a methyl group,
- $R_3$ is a hydrocarbon group having one to six carbon atoms, and
- x is an average number of repeating monomeric units for producing an average molecular weight for said polymer between about 1,000 and about 1,000,000.

Preferably, $R_1$ and $R_2$ are, independently, a hydrogen atom or a methyl group, and $R_3$ is an alkyl group with zero to two heteroatoms.

The term "mer-unit" is used to describe both the monomers that are reacted to form polymers, and the polymer units that result from the conversion of one type of polymer units into another type of polymer units, by some reaction or conversion which occurs subsequent to the polymerization reaction.

B may be an N-acyldehydroalanine derivative mer-unit that is the same as, or a variant of, A. For example, the inhibitor may comprise a copolymer of two mer-units derived from two different esters of an N-acyldehydroalanine, or a copolymer of one mer-unit derived from an ester of an N-acyldehydroalanine with another mer-unit derived from an amide of an N-acyldehydroalanine. Alternatively, B is a monomer or mer-unit that is known, when polymerized with itself, to exhibit hydrate inhibition.

For example, B may be an N-vinyl amide, an N-allyl amide, an acrylamide or methacrylamide, an N-vinyl lactam, a maleimide, or a vinyl oxazoline (a ring-closed cyclic imino ether).

The A and B mer-unit proportions, or mole ratio of x to y, can vary. The mole ratio m:n may vary from about 5:95 to about 95:5, or from about 25:75 to about 75:25, or from about 45:55 to about 55:45. Ratios which provide the most effective inhibitors for a given system are preferred.

Some preferred inhibitors derived from ester monomers include, but are not limited to, homopolymers and copolymers of methyl 2-acetamidoacrylate and ethyl 2-acetamidoacrylate. Some preferred inhibitors derived from amide monomers include, but are not limited to, homopolymers and copolymers of methyl 2-acetamidoacrylamide, ethyl 2-acetamidoacrylamide, and i-propyl 2-acetamidoacrylamide. The copolymers may be copolymers of ester monomers, or amide monomers, or copolymers of ester monomers with amide monomers.

DETAILED DESCRIPTION OF THE INVENTION

Inventive Method

The inventive method of the invention inhibits the formation of clathrate hydrates in a fluid having hydrate-forming constituents. Formation of clathrate hydrates means the nucleation, growth, and/or agglomeration of clathrate hydrates.

Such clathrate hydrates may be formed in a fluid whether it is flowing or substantially stationary, but are most problematic in flowing fluids conveyed in a pipe. For example, flow restrictions arising from partial or complete blockages in a fluid can arise as clathrate hydrates adhere to and accumulate along the inside wall of the pipe used to convey the fluid. In addition, the invention can be used for inhibiting formation of clathrate hydrates in substantially stationary fluids.

In one embodiment of the invention, a concentrated solution or mixture of one or more of the inhibitors of the invention is introduced into a petroleum fluid. The term petroleum fluid includes fluids that are gases and/or liquids when under standard conditions, such as natural gas, crude oil, and various petroleum product streams. As the inhibitor solution of the invention is substantially dispersed in the fluid, it reduces the rate that clathrate hydrates are formed, and thereby reduces the tendency for a flow restriction to occur.

In a preferred embodiment, the solid inhibitor is first dissolved into an appropriate carrier solvent or liquid to make a concentrated solution or mixture.

Alternatively, the inhibitor may be provided in a solution where it is left as dissolved in its polymerization reaction solvent. The solvent will preferably dissolve the inhibitor and, for convenience, such liquids are referred to hereafter as solvents, whether they produce an inhibitor solution, emulsion, or other type of mixture. The carrier solvent's principal purpose is to act as a carrier for the inhibitor and to facilitate the inhibitor's dispersion into the petroleum fluid. Any solvent suitable for delivering the inhibitor to the petroleum fluid may be used. Such carrier solvents include, but are not limited to, water, brine, sea water, produced water, methanol, ethanol, propanol, isopropanol, glycol, or mixtures of such solvents. Other solvents familiar to those skilled in the art may also be used. Aqueous solvents (water, brine, sea water, produced water) are preferred.

It should be understood that the use of a carrier solvent is not required to practice the invention, but it is a convenient method of introducing and dispersing the inhibitor into the fluid. In many applications, the use of a carrier solvent will facilitate treatment of the fluid stream. As noted above, water is frequently present along with hydrocarbons and other gases present in petroleum fluids. The presence of an aqueous phase in a petroleum fluid is not essential, but if present, will facilitate the dispersion of the inhibitor within the petroleum fluid. The presence of a significant aqueous phase in the petroleum fluid may reduce or eliminate the amount of carrier solvent required for dispersion of the inhibitor.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition and molecular weight of the inhibitor, the system temperature, the inhibitor's solubility in the carrier solvent at application conditions, and the presence of an aqueous phase in the petroleum fluid. If there is no aqueous phase present in the petroleum fluid, a dilute solution may be preferred.

The inhibitor mixture is introduced into the petroleum fluid using mechanical equipment, such as a chemical injection pump or other device which will be apparent to those skilled in the art. However, such equipment is not essential to practicing the invention. To ensure an efficient and effective treatment of the petroleum fluid with the inhibitor mixture, two factors should be considered.

First, an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion throughout the petroleum fluid.

Second, because the inhibitor primarily serves to inhibit the formation of clathrate hydrates, rather than to reverse such formation, it is important to treat the fluid prior to substantial formation of clathrate hydrates. As a wet petroleum fluid cools, it will eventually reach a temperature, known as the hydrate equilibrium dissociation temperature, or $T_{eq}$, below which hydrate formation is thermodynamically favored. A petroleum fluid's $T_{eq}$ will shift as the pressure applied to the fluid, and its composition, change. Various methods for determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The inhibitor's solubility over a wide range of temperatures is important for ensuring that the polymer can be effectively injected under typical field conditions.

Many polymeric inhibitors exhibit lower critical solution temperature, or LCST behavior when dissolved in water or brine. As the temperature of such solutions is increased, the polymer reaches a temperature where it will precipitate out of solution.

The temperature above which the polymer will precipitate out of its solution is known as the polymer's cloud point, or $T_{cp}$. Various methods for determining a polymer's $T_{cp}$ at various compositions and pressures are well known to those skilled in the art.

When the inhibitor solution temperature exceeds the cloud point for a particular polymer, the polymer will precipitate out of solution.

It is important to convey the inhibitor solution to the petroleum fluid at a temperature lower than its cloud point. The cloud point for a given polymer solution is dependent upon several factors, including the polymer concentration, other components present in the solution (such as dissolved salts), and the ambient temperature and pressure of the solution. In many oil and gas production situations, the inhibitor is injected under conditions where the temperature of the petroleum fluid to which the inhibitor is added can range as high as 100° C.–150° C.(212° F.–302° F.) or more. Consequently, it is desirable to select a polymer that exhibits a cloud point greater than the anticipated temperature of the petroleum fluid. Alternatively, the inhibitor could be injected at some point in the production system where the temperature of the petroleum fluid is below the polymer solution's cloud point.

Sub-cooling is a measure of the effectiveness of a hydrate inhibitor. When a petroleum fluid contains hydrate-forming constituents, clathrate hydrates will begin to form rapidly at a given temperature. As the hydrate-forming constituents (typically gases) are consumed in forming clathrate hydrates, there is an abrupt and corresponding decrease in the volume of gas in the petroleum fluid as hydrates are formed. The temperature at which this abrupt decrease in the volume of gas is observed is known as the temperature of onset for hydrate formation, or $T_{os}$. Various methods known to those skilled in the art, such as the mini-loop procedure described below, may be used to determine a fluid's $T_{os}$. As noted above, the hydrate equilibrium dissociation temperature, or $T_{eq}$, is the temperature below which hydrate formation is thermodynamically favored in an aqueous/gas solution without an inhibitor present. A hydrate inhibitor's sub-cooling, or $T_{sub}$, is the difference between the $T_{eq}$ and the $T_{os}$. (Note that the subcooling is not actually a temperature, but a difference, measured in degrees, between two temperatures.) Therefore, for a given pressure, the greater the sub-cooling temperature, the more effective the inhibitor.

Typically, an aqueous sea salt/gas solution with no inhibitor present produces a $T_{sub}$ of about 3 to 4° C.(5 to 7° F.).

The polymers of the invention offer the unique advantage of effective hydrate inhibition, as measured by sub-cooling, combined with high cloud point temperatures.

The concentration of inhibitor present in the aqueous phase of a petroleum fluid will typically vary from about 0.01 percent by weight (wt %) to about 5 wt %, based upon the aqueous phase present in the fluid. Preferably, the inhibitor will be present at a concentration of from about 0.01 wt % to about 0.5 wt %. Most preferably, the inhibitor will be present in an aqueous phase at a concentration of from about 0.1 wt % to about 0.5 wt %. The effective amount of an inhibitor for a particular application can be determined by those skilled in the art, by considering the inhibitor's performance factors, the degree of inhibition required for the petroleum fluid, and the inhibitor's cost. A higher inhibitor concentration can be used to lower the temperature at which a hydrate blockage would occur.

Novel Inhibitors

The inhibitors of the invention may be represented by the following general formula:

where the sum of x and y is an average number sufficient to produce a number average molecular weight between about 1,000 and about 1,000,000.

In one embodiment, A is the following "mer-unit" produced from an ester of an N-acyldehydroalanine:

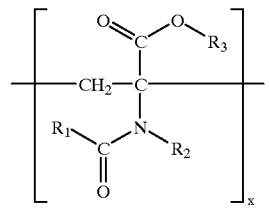

where,
 $R_1$ is a hydrogen atom or a hydrocarbon group having one to six carbon atoms,
 $R_2$ is a hydrogen atom or a methyl group,
 $R_3$ is a hydrocarbon group having one to six carbon atoms, and
 x is an average number of repeating monomeric units for producing an average molecular weight for said polymer between about 1,000 and about 1,000,000.

Preferably, $R_1$ and $R_2$ are, independently, a hydrogen atom or a methyl group, and $R_3$ is an alkyl group with zero to two heteroatoms.

In another embodiment, A is the following "mer-unit" produced from an amide of an N-acyldehydroalanine:

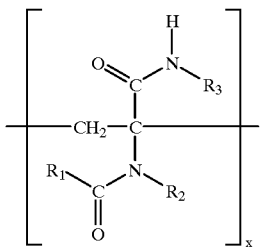

$R_1$ is a hydrogen atom or a hydrocarbon group having one to six carbon atoms, $R_2$ is a hydrogen atom or a methyl group, $R_3$ is a hydrocarbon group having one to six carbon atoms, and x is an average number of repeating monomeric units for producing an average molecular weight for said polymer between about 1,000 and about 1,000,000.

Preferably, $R_1$ and $R_2$ are, independently, a hydrogen atom or a methyl group, and $R_3$ is an alkyl group with zero to two heteroatoms.

Some preferred inhibitors derived from ester monomers include, but are not limited to, homopolymers and copolymers of methyl 2-acetamidoacrylate and ethyl 2-acetamidoacrylate. Some preferred inhibitors derived from amide monomers include, but are not limited to, homopolymers and copolymers of methyl 2-acetamidoacrylamide, ethyl 2-acetamidoacrylamide and i-propyl 2-acetamidoacrylamide. The copolymers may be copolymers of the ester monomers, or amide monomers, or copolymers of ester monomers with amide monomers, B may be a mer-unit that is the same as, or a variant of, A. If A and B are both N-acyldehydroalanine mer-units, then one may be an ester derivative and the other an amide derivative. Alternatively, B is a monomer or mer-unit that is known, when polymerized with itself, to exhibit hydrate inhibition. For example, B may be an N-vinyl amide, an N-allyl amide, an acrylamide or methacrylamide, an N-vinyl lactam, a maleimide, or a vinyl oxazoline (a ring-closed cyclic imino ether). For example, methyl 2-acetamidoacrylate could be copolymerized with N-vinyl-N-methyl acetamide (VIMA) or N-vinylcaprolactam (VCap) to produce copolymers in the class described above.

The A and B mer-unit proportions, or mole ratio of x to y can vary. The mole ratio of m:n may vary from about 5:95 to about 95:5, or from about 25:75 to about 75:25, or from about 45:55 to about 55:45. Ratios which provide the most effective inhibitors for a given system are preferred.

The term "homopolymer" as used herein includes a polymer having the same monomeric repeating unit, while the term "copolymer" as used herein includes polymers having two or more different monomeric repeating units. The term "polymer" is used for all types of polymers, including both homopolymers and copolymers.

In one alternative, the B mer unit is an N-vinyl amide of the formula:

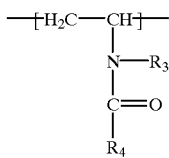

where $R_3$ is a hydrogen or a hydrocarbon group having one to six carbon atoms, and zero to two heteroatoms selected from the group consisting of oxygen, nitrogen, and combinations thereof, $R_4$ is a hydrocarbon group having one to six carbon atoms, and zero to two heteroatoms selected from the group consisting of oxygen and nitrogen and combinations thereof; and $R_3$ and $R_4$ have a sum total of carbon atoms greater than or equal to one, but less than eight. The $R_3$ and $R_4$ carbon atoms may be branched, normal, or cyclic; $R_3$ may be hydrogen or an alkyl, cycloalkyl, or aryl group; and $R_4$ is an alkyl, cycloalkyl, or an aryl group.

Preferred N-vinyl amides include N-methyl N-vinyl acetamide, also known as N-vinyl N-methyl acetamide (VIMA).

Alternatively, the B mer-unit is an N-allyl amide of the formula:

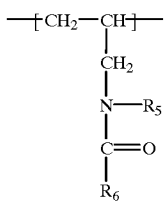

where $R_5$ is a hydrogen or hydrocarbon group having one to six carbon atoms, and zero to two heteroatoms selected from the group consisting of oxygen, nitrogen, and combinations thereof; $R_6$ is a hydrocarbon group having one to six carbon atoms, and zero to two heteroatoms selected from the group consisting of oxygen and nitrogen and combinations thereof; R, and R, have a sum total of carbon atoms greater than or equal to one, but less than eight. The $R_5$ and $R_6$ carbon atoms may be branched, normal, or cyclic; $R_5$ is either hydrogen or an alkyl, cycloalkyl, or an aryl group; and $R_6$ is an alkyl, cycloalkyl, or an aryl group.

Alternatively, the B mer-unit is an acrylamide or methacrylamide of the formula:

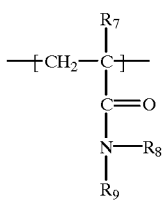

where $R_7$ is hydrogen or a methyl group; $R_8$ is a hydrocarbon group having one to ten carbon atoms, and zero to four heteroatoms selected from the group consisting of nitrogen, oxygen, sulfur, and combinations thereof; and $R_9$ is a hydrogen atom or a hydrocarbon group having one to ten carbon atoms, and zero to four heteroatoms selected from the group consisting of nitrogen, oxygen, sulfur, and combinations thereof, $R_8$ and R, have a sum total of carbon atoms greater than or equal to one, but less than eight. The $R_8$ and $R_9$ carbon atoms may be branched, normal, or cyclic; $R_8$ is an alkyl, cycloalkyl, or an aryl group; and $R_9$ is either hydrogen or an alkyl, cycloalkyl, or an aryl group.

Preferred acrylamides and methacrylamides are N-substituted acrylamides and N-substituted methacrylamides, such as isopropylacrylamide (IPA), methacryloylpyrrolidine (MAPYD) and N-isopropyl methacrylamide (IPMA).

Alternatively, the B mer-unit is an N-vinyl lactam of the formula:

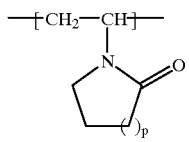

where p ranges from one to three, such as N-vinyl caprolactam (VCap), and N-vinyl pyrrolidone (VP), and N-vinyl piperidone (VPip). Preferred N-vinyl lactams include N-vinyl caprolactam (VCap), and N-vinyl pyrrolidone (VP), and VCap is particularly preferred.

Some preferred inhibitors include, but are not limited to, homopolymers and copolymers of methyl 2-acetamidoacrylate, ethyl 2-acetamidoacrylate, methyl 2-acetamidoacrylamide, ethyl 2-acetamidoacrylamide and i-propyl 2-acetamidoacrylamide.

The generic structures above as well as the examples given are intended to cover any substantially water soluble polymers including, but not limited to, copolymers, terpolymers, other complex polymers, and blends and mixtures thereof, having the structural units described, whether such structural units or their related monomers were used to synthesize the polymer or not. The monomers disclosed below for synthesizing the polymers containing the preferred mer-units are not intended to limit the scope of the claims. Other starting materials and synthesis techniques, which are currently known or may become known, will be apparent to those skilled in the art as alternatives to synthesizing the polymers of the claimed invention. Accordingly, all polymers having at least the structural unit identified in the claims below, even though such polymers may be produced from starting materials and/or by means not explicitly referenced herein, are intended to fall within the scope of the claimed invention. Other polymers not specifically identified in the examples below will become apparent to those skilled in the art in light of the detailed discussion below. Such polymers are intended to fall within the scope of the claimed invention.

The above-described polymers and copolymers can be used in a mixture with other polymers or additives useful for enhancing inhibitor performance, or other operating parameters other than those specified here. The above-described N-acyldehydroalanine ester and amide homopolymers and copolymers could be used in a mixture with other polymers or additives useful for enhancing inhibitor performance, including but not limited to, various polymers, such as poly(N-vinylpyrrollidone) (PVP), poly(N-vinylcaprolactam) (PVCap), copolymers of PVP and PVCap, other homopolymers and copolymers of N-vinylamides, various alcohols, such as methanol, ethanol, propanols, or ethylene glycols.

EXPERIMENTAL RESULTS

Inhibitor Synthesis

Standard laboratory procedures familiar to those skilled in the art were used to synthesize the polymers and copolymers identified below. The polymers were isolated and characterized using techniques well-known to those skilled in the art, such as carbon-13 (13C) nuclear magnetic resonance spectroscopy (NMR). Direct measurement of the molecular weight of the polymers of the invention was made using Gel Permeation Chromatography (GPC).

The N-acyldehydroalanine ester and amide monomers tested were derived from 2-acetamidoacrylic acid, which is commercially available from Aldrich Chemical Company. Methyl 2-acetamidoacrylate was obtained from Aldrich Chemical Company, and other 2-acetamidoacrylates were prepared by esterification of 2-acetamidoacrylic acid using standard esterification procedures. The N-acyldehydroalanine amide monomers were synthesized from 2-acetamidoacrylic acid using the well-known mixed anhydride method of coupling commonly used in peptide synthesis (see e.g. F. M. F. Chen, Y. Lee, R. Steinauer and N. L. Benoitin, *Can. J Chem.*, 65, 613 (1987)). A representative example ofthis synthesis procedure is given for i-propyl 2-acetamidoacrylamide.

A round bottomed three necked flask equipped with an overhead stirrer, addition funnel with nitrogen inlet and drying tube was purged with nitrogen. 10 g (0.077 moles) 2-acetamidoacrylic acid (Aldrich Chemical Company) was placed in the flask with 250 mL dry tetrahydrofuran (THF). The solution was stirred and cooled to −15° C. in a dry ice-acetone bath. 7.8 g (0.077 moles) 4-methyl morpholine was added to the solution quickly. 1 1.1 g (0.081 moles) isobutyl chloroformate was added quickly to the solution. The solution was stirred for 15 minutes. A yellowish-white precipitate formed. 4.8 g (0.081 moles) isopropyl amine was added quickly to the mixture and stirred for 5 minutes. The bath was removed, and the reaction mixture was allowed to warm to room temperature with stirring.

The product was isolated by first removing the THF using rotary evaporation. The residue was dissolved in methylene chloride and water. The methylene chloride layer was separated, dried and the methylene chloride removed by rotary evaporation. The crude product was characterized by $^{13}$C NMR.

The N-acyldehydroalanine ester and amide monomers were polymerized using standard free-radical polymerization procedures.

EXAMPLE 1

Illustrative - Poly(methyl 2-acetamidoacrylate)

A round bottomed three necked flask equipped with an overhead stirrer, addition funnel with nitrogen inlet and drying tube was purged with nitrogen.

Anhydrous methanol was degassed by purging with nitrogen. 5.0 g (0.035 moles) methyl 2-acetamidoacrylate was placed in the flask with 50 mL of methanol. The solution was stirred and heated to 60° C. 0.15 g (7.8×10$^{-4}$ moles) 2,2'-azobis(methylbutronitrile) (Vazo® 67 from DuPont) was dissolved in a few mL of methanol and added to the solution. The reaction mixture was heated overnight.

After cooling, the methanol was removed by rotary evaporation. The product was characterized by $^{13}$C NMR, which indicated the following formula:

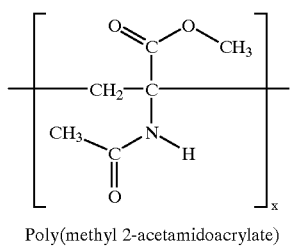

Poly(methyl 2-acetamidoacrylate)

EXAMPLE 2

Illustrative - Copolymer of methyl 2-acetamidoacrylate and N-vinyl N-methylacetamide The same procedure described in Example 1 was used to make this copolymer, except that 2.5g (0.0175 moles) methyl 2-acetamidoacrylate and 1.73g (0.0175 moles) N-methylacetamide (VIMA) were used as the monomers. The $^{13}$C NMRs of the polymer product were consistent with the following structure:

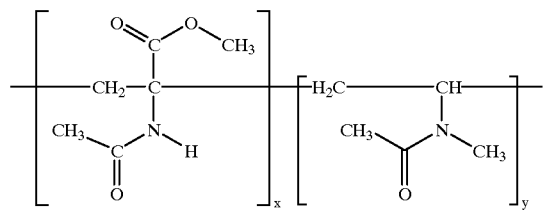

Copolymer of Methyl 2-acetamidoacrylate and N-vinyl-N-methylacetamide (VIMA)

EXAMPLE 3

Comparative

Poly (VIMA)

t-Butanol was dried overnight over activated molecular sieves and then purged for about 4 hours with a stream of dry nitrogen gas. A 250 mL flask equipped with an overhead stirrer, condenser with drying tube, thermometer and nitrogen inlet was purged with nitrogen. 25.0 g (0.25 moles) N-methyl-N-vinylacetamide (obtained from Aldrich Chemical Company) were loaded into the flask with about 1 00 mL t-butanol. 0.46 g (0.0028 moles) of 2,2'-azobis (2-methylpropionitrile), also known as AIBN (obtained from Eastman Chemical Company) was added and the reaction heated at 65 ° C. for about 8 hours. The reaction was cooled and the product isolated by vacuum evaporation of the solvent. The product was characterized by 13C NMR and GPC.

Mini-loop Testing Procedure

One method for evaluating an inhibitor's effectiveness uses a bench-scale high pressure apparatus referred to as a mini-loop apparatus. A mini-loop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume (vol %) synthetic sea water solution having about 3.5% total ionized salts, 40 vol % hydrocarbon condensate (i.e., $C_6$+), and 20 vol % hydrocarbon gas mixture is circulated around the loop at constant pressure. The hydrocarbon gas mixture is comprised of approximately 85 mole % methane, 5 mole % ethane, 5 mole % propane, and 5 mole% of $C_4$+. The inhibitor is typically injected into the loop as an aqueous solution to produce the desired weight percent (wt %) concentration of inhibitor in the aqueous sea salt/gas solution. Generally, hydrate inhibitors are evaluated at about 0.5 wt % of the aqueous sea salt/gas solution.

The fluid is circulated at a constant velocity of about 0.76 m/second (2.5 feet/second). The loop and its pump are operated in a controlled temperature water bath to control the temperature of the fluid circulating in the loop. The bath water is circulated to ensure uniform temperature throughout the bath and rapid heat transfer between the bath water and the loop. As the loop temperature changes or as hydrates form, the gas volume in the loop will change accordingly. Therefore, to maintain constant pressure in the loop, a pressure-compensating device is required.

Such a device can be comprised of a gas cell and a hydraulic oil cell separated by a floating piston. As the gas volume in the loop changes, oil may be added or removed from the oil cell to produce a commensurate addition or removal of gas to the loop. Mini-loop tests are typically run at a pressure of about 6996 KPa absolute (1,000 pounds per square inch gauge (p.s.i.g.)). However, any pressure from 101 to 20,786 KPa absolute (0 to 3,000 p.s.i.g.) could be selected for evaluating an inhibitor's performance.

The temperature of the water bath is reduced at a constant rate, preferably about 6° F.(3.3° C.) per hour, from an initial temperature of about 70° F.(21° C.). At some temperature, clathrate hydrates begin to rapidly form. As gas is consumed in forming clathrate hydrates, there is an abrupt and corresponding decrease in the volume of gas in the fluid as hydrates are formed. The temperature at which the abrupt decrease in the volume of gas is observed is measured as the temperature of onset for hydrate formation, or $T_{os}$, and compared to the hydrate equilibrium dissociation temperature, or $T_{eq\ 3}$ to determine the inhibitor's subcooling. A hydrate inhibitor's subcooling, or $T_{sub}$, is the difference between the $T_{eg}$ and the $T_{os}$. (Note that the subcooling is not actually a temperature, but a difference, measured in degrees, between two temperatures.) For a given pressure, the greater the subcooling, the more effective the inhibitor.

Mini-loop Test Results

For the purpose of illustrating the invention, the various polymeric inhibitors described above were evaluated using the mini-loop testing procedure described above. The results of these evaluations are provided in Table 1 below.

TABLE 1

| Example | Mole Ratio | Conc. (wt %) | Subcooling (° F.) | Subcooling (° C.) | Cloud Point (° C.) |
|---|---|---|---|---|---|
| Example 1 | NA | 0.5 | 11.0 | 6.1 | <100 |
| Example 2 | 50:50 | 0.5 | 12.3 | 6.8 | <100 |
| Example 3 | NA | 0.5 | 12.5 | 6.9 | <100 |

The data show that the N-acyldehydroalanine homopolymers and copolymers of the invention are effective inhibitors with a good balance of properties. Inhibitors selected according to this invention are generally as effective (as measured by subcooling) as comparable inhibitors, such as poly(VIMA). Furthermore, copolymers of N-acyledehydioalanine monomers copolymerized with monomers of effective hydrate inhibitors, such as poly (VIMA), are also effective inhibitors. Typically, properties and performance of copolymers are the additive of the two homopolymers. These systems exhibit an unexpected synergy.

The means and method for practicing the invention and the best mode contemplated for practicing the invention have been described. It is to be understood that the foregoing is illustrative only and that other means and techniques can be employed without departing from the true scope of the invention as claimed herein.

I claim:

1. A method for inhibiting the formation of clathrate hydrates in a fluid having hydrate-forming constituents, the method comprising contacting the fluid with an effective amount of inhibitor wherein the inhibitor comprises a substantially water-soluble polymer having a plurality of one or more mer-units selected from the group consisting of esters of N-acyldehydroalanine and amides of N-acyldehydroalanine.

2. The method of claim 1 wherein the polymer is a copolymer of an ester of N-acyldehydroalanine and an amide of N-acyldehydroalanine.

3. The method of claim 2 wherein the polymer is represented by the formula:

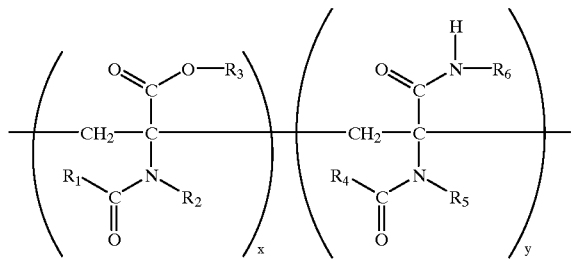

where,
$R_1$ is a hydrogen atom or a hydrocarbon group having one to six carbon atoms,
$R_2$ is a hydrogen atom or a methyl group,
$R_3$ is a hydrocarbon group having one to six carbon atoms,
$R_4$ is a hydrogen atom or a hydrocarbon group having one to six carbon atoms,
$R_5$ is a hydrogen atom or a methyl group,
$R_6$ is a hydrocarbon group having one to six carbon atoms, and
wherein the sum of x and y provide a number of repeating monomeric units sufficient to produce a polymer with a number average molecular weight between about 1,000 an about 1,000,000.

4. The method of claim 3 wherein the copolymer is mixed with a carrier solvent prior to treating the fluid, and wherein the carrier solvent is selected from the group consisting of water, brine, sea water, produced water, methanol, ethanol, propanol, isopropanol, glycol, and mixtures thereof.

5. The method of claim 4 wherein the inhibitor is provided in an aqueous solution, and the fluid is a petroleum fluid.

6. The method of claim 5 wherein the inhibitor is present in the fluid at a concentration of from 0.01 wt % to about 0.5 wt % of the water present in the fluid.

7. The method of claim 1 wherein the polymer additionally comprises a plurality of one or more mer-units selected from the group consisting of N-vinyl amides, N-allyl amides, acrylamides, methacrylamides, N-vinyl lactams, maleimides, and vinyl oxazolines.

8. The method of claim 1 wherein the inhibitor comprises a substantially water-soluble polymer having a plurality of the following mer-unit produced from an ester of an N-acyldehydroalanine:

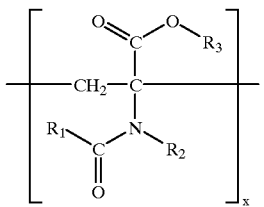

where,
$R_1$ is a hydrogen atom or a hydrocarbon group having one to six carbon atoms,
$R_2$ is a hydrogen atom or a methyl group,
$R_3$ is a hydrocarbon group having one to six carbon atoms, and
wherein the polymer includes a sufficient number of repeating monomeric units x to produce a number average molecular weight for said polymer between about 1,000 and about 1,000,000.

9. The method of claim 8 wherein the polymer is a homopolymer.

10. The method of claim 8 wherein the polymer is a copolymer of at least two esters of N-acyldehydroalanine.

11. The method of claim 8 wherein the polymer additionally comprises a plurality of mer-units selected from the group consisting of N-vinyl amides, N-allyl amides, acrylamides, methacrylamides, N-vinyl lactams, maleimides, and vinyl oxazolines, wherein the ratio of ester mer-units to comonomer mer-units is from about 5:95 to about 95:5, and the number average molecular weight of the polymer is between about 1000 and about 1,000,000.

12. The method of claim 8 wherein the copolymer is mixed with a carrier solvent prior to treating the fluid, and wherein the carrier solvent is selected from the group consisting of water, brine, sea water, produced water, methanol, ethanol, propanol, isopropanol, glycol, and mixtures thereof.

13. The method of claim 12 wherein the inhibitor is provided in an aqueous solution, and the fluid is a petroleum fluid.

14. The method of claim 13 wherein the inhibitor is present in the fluid at a concentration of from 0.01 wt % to about 0.5 wt % of the water present in the fluid.

15. A method for inhibiting the formation of clathrate hydrates in a fluid having hydrate-forming constituents, the method comprising contacting the fluid with an effective amount of inhibitor wherein the inhibitor comprises a substantially water-soluble polymer having a plurality of the following mer-unit produced from an amide of an N-acyldehydroalanine:

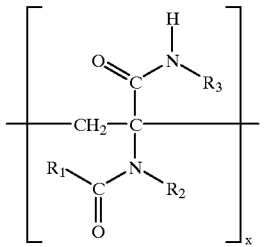

where, $R_1$ is a hydrogen atom or a hydrocarbon group having one to six carbon atoms, $R_2$ is a hydrogen atom or a methyl group, $R_3$ is a hydrocarbon group having one to six carbon atoms, and wherein the polymer includes a sufficient number of repeating monomeric units x to produce a number average molecular weight for said polymer between about 1,000 and about 1,000,000.

16. The method of claim 15 wherein the polymer is a homopolymer.

17. The method of claim 15 wherein the polymer is a copolymer of at least two amides of N-acyldehydroalanine.

18. The method of claim 15 wherein the polymer additionally comprises a plurality of mer-units selected from the group consisting of N-vinyl amides, N-allyl amides, acrylamides, methacrylamides, N-vinyl lactams, maleimides, and vinyl oxazolines, wherein the ratio of amide mer-units to mer-units is from about 5:95 to about 95:5, and the number average molecular weight of the polymer is between about 1000 and about 1,000,000.

19. The method of claim 15 wherein the copolymer is mixed with a carrier solvent prior to treating the fluid, and wherein the carrier solvent is selected from the group consisting of water, brine, sea water, produced water, methanol, ethanol, propanol, isopropanol, glycol, and mixtures thereof.

20. The method of claim 19 wherein the inhibitor is provided in an aqueous solution, and the fluid is a petroleum fluid.

21. The method of claim 20 wherein the inhibitor is present in the fluid at a concentration of from 0.01 wt % to about 0.5 wt % of the water present in the fluid.

* * * * *